C. B. WIXOM.
PUZZLE.
APPLICATION FILED NOV. 11, 1913.

1,168,987.

Patented Jan. 18, 1916.
4 SHEETS—SHEET 1.

Witnesses
Gerald Hennesy
James A. Koell

Inventor
C. Bonner Wixom,
By Victor J. Evans
Attorney

THE COLUMBIA PLANOGRAPH CO., WASHINGTON, D. C.

C. B. WIXOM.
PUZZLE.
APPLICATION FILED NOV. 11, 1913.

1,168,987.

Patented Jan. 18, 1916.
4 SHEETS—SHEET 2.

Inventor
C. Bonner Wixom,
By Victor J. Evans
Attorney

Witnesses

C. B. WIXOM.
PUZZLE.
APPLICATION FILED NOV. 11, 1913.

1,168,987.

Patented Jan. 18, 1916.
4 SHEETS—SHEET 3.

Witnesses
Gerald Hennesy
James P. Koehl

Inventor
C. Bonner Wixom,
By Victor J. Evans
Attorney

THE COLUMBIA PLANOGRAPH CO., WASHINGTON, D. C.

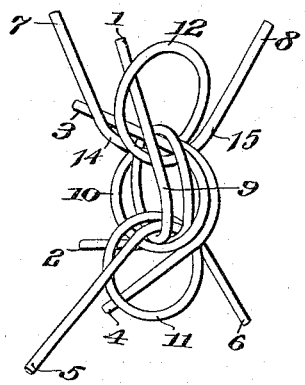
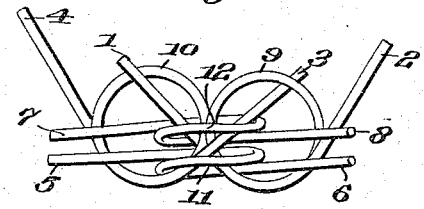
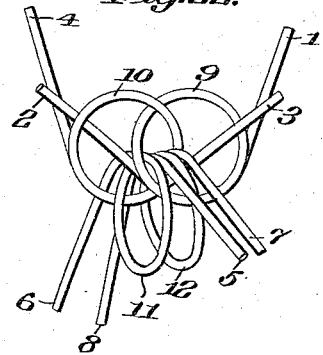
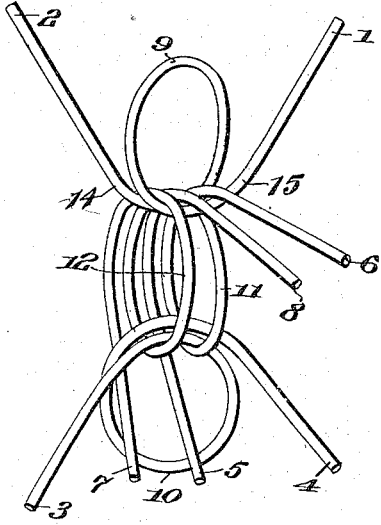
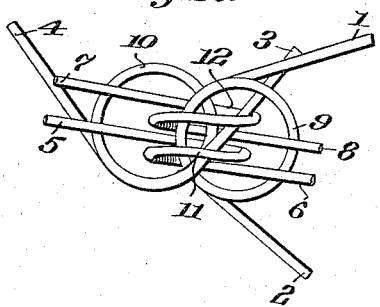
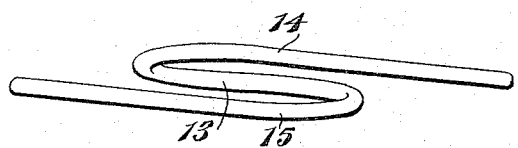

UNITED STATES PATENT OFFICE.

CLAUDIOUS BONNER WIXOM, OF HAGERMAN, NEW MEXICO.

PUZZLE.

1,168,987.  Specification of Letters Patent.  Patented Jan. 18, 1916.

Application filed November 11, 1913. Serial No. 800,362.

*To all whom it may concern:*

Be it known that I, CLAUDIOUS BONNER WIXOM, a citizen of the United States, residing at Hagerman, in the county of Chaves and State of New Mexico, have invented new and useful Improvements in Puzzles, of which the following is a specification.

This invention relates to puzzles, and has for its object the provision of an article of this character which will be inexpensive of construction, and formed with a view of rendering the operation of assembling and separating its various parts extremely difficult, yet amusing and entertaining.

A further object of the invention is the provision of a puzzle wherein the various parts thereof will be exact duplicates of one another.

Another object of the invention is the provision of a puzzle wherein the parts thereof are each formed in such manner that they will not be unduly sprained or sprung during the operation of assembling or disassembling the same.

With these and other objects in view, the invention consists of certain novel features of construction, combination and arrangement of parts as will be hereinafter described and claimed.

Figure 1:
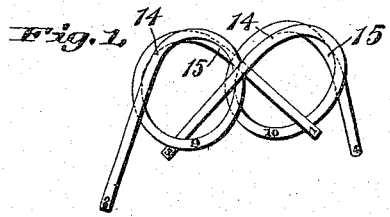
Figure 6:
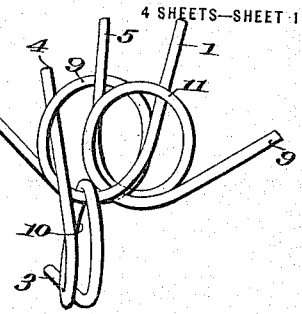
Figure 2:
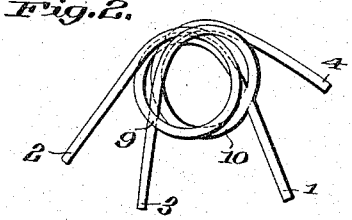
Figure 7:
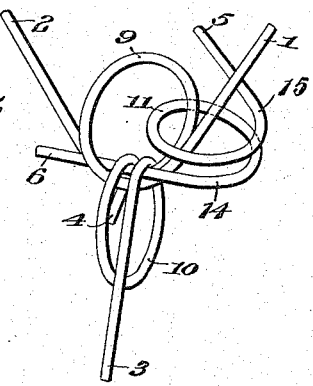
Figure 3:
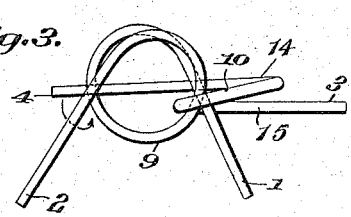
Figure 4:
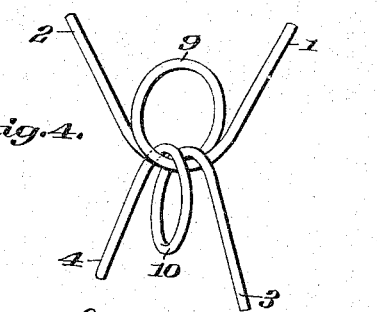
Figure 8:
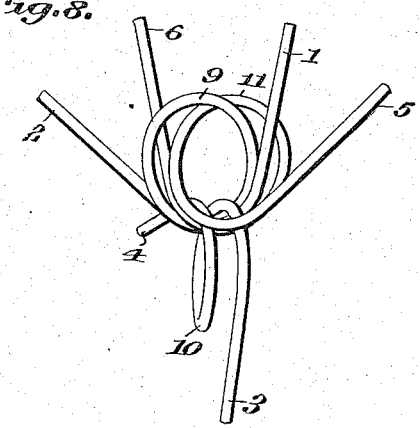
Figure 5:
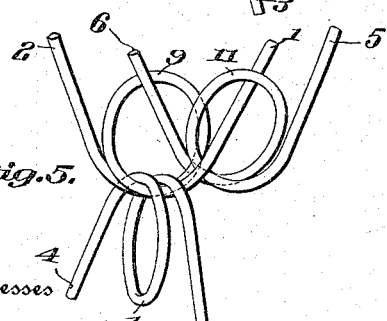
Figure 9:
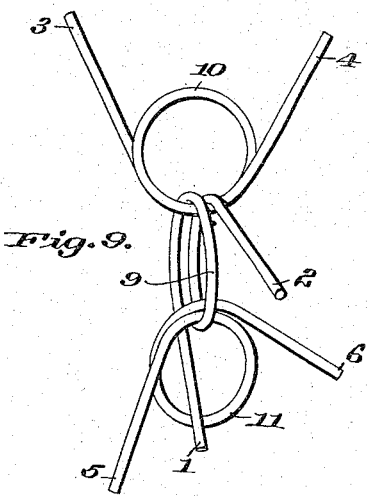
Figure 10:
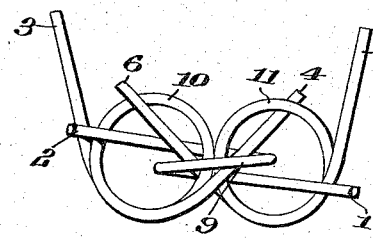
Figure 11:
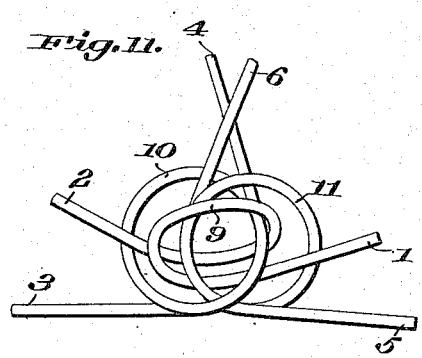
Figure 12:
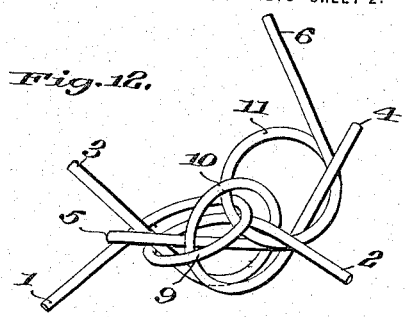
Figure 13:
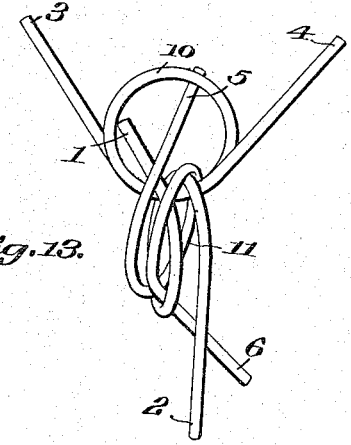
Figure 14:
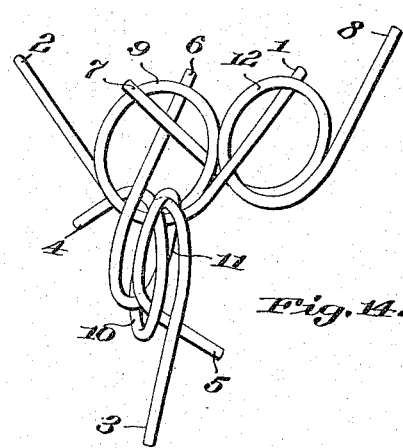
Figure 15:
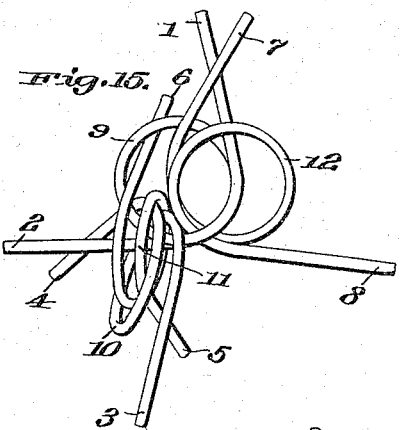
Figure 18:
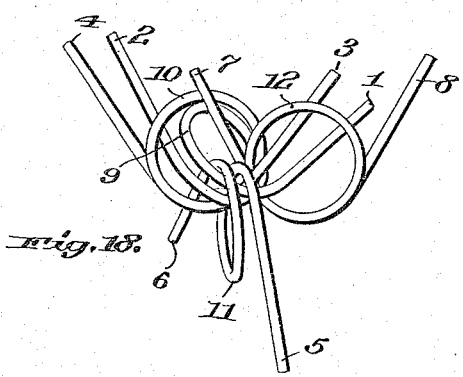
Figure 16:
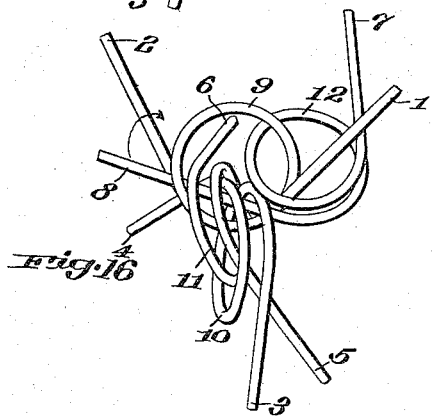
Figure 19:
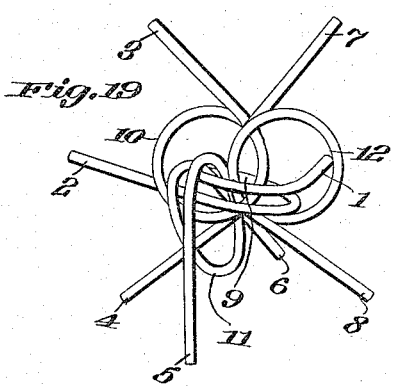
Figure 17:
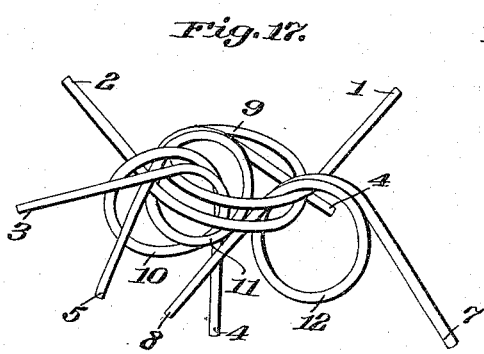
Figure 20:
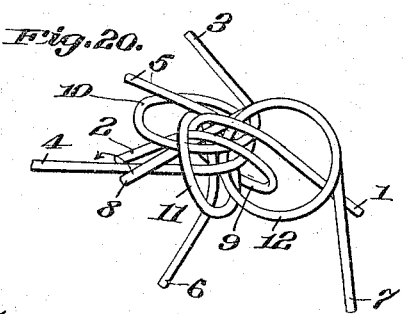

In the accompanying drawings:—Figure 1 is a perspective view of two members of the puzzle, showing the initial step required to connect said members with each other; Fig. 2 is a similar view, showing the members in their second positions; Fig. 3 is a similar view, showing the third positions of the members; Fig. 4 is a similar view, showing the fourth positions of said members; Fig. 5 is a similar view, showing the members in their required connected positions; Fig. 6 is a similar view, showing the initial position of the third member with one of the first members; Fig. 7 is a similar view, showing the next position of the third member; Fig. 8 is a similar view, showing the third position of the third member; Fig. 9 is a similar view, showing the fourth position of the third member; Fig. 10 is a similar view, showing the fifth position of the third member; Fig. 11 is a similar view, showing the sixth position of said third member; Fig. 12 is a similar view, showing the seventh position of the third member; Fig. 13 is a similar view, showing the eighth position of the third member; Fig. 14 is a similar view, showing the ninth position of said third member; Fig. 15 is a similar view, showing the final position of said third member; Fig. 16 is a similar view, showing the initial position of one of the first members and the fourth member; Fig. 17 is a similar view, showing the second position thereof; Fig. 18 is a similar view, showing the third position of the fourth member; Fig. 19 is a similar view, showing the fourth position of said fourth member; Fig. 20 is a similar view, showing the fifth position of said fourth member; Fig. 21 is a similar view, showing the sixth position of the fourth member; Fig. 22 is a similar view, showing the seventh position of the fourth member; Fig. 23 is a similar view, showing the eighth position of the fourth member; Fig. 24 is a similar view, showing the ninth position of the fourth member; Fig. 25 is a similar view, showing one of the final movements of one of the first members; Fig. 26 is a detail perspective view of one of the members.

The puzzle comprises separable members 9, 10, 11 and 12, each formed from a single piece of wire, bent to provide an intermediate circular loop 13 having parallel spaced overlying portions or convolute free ends 14 and 15, the ends 14 and 15 of the member 9 being merged into reversely extending branches 1 and 2, while the member 10 has its ends 14 and 15 extended into similar branches 3 and 4; the ends of the member 11 are extended into branches 5 and 6, and the ends of the member 12 extended, in the same manner into the branches 7 and 8, the distance between the free ends of the branches being twice the inside diameter of the loops.

As the operations necessary to a separation of the various parts of the puzzle are nearly reverse to operations that are required to a proper connection of such parts, only the latter operations will be specified, and may be known as follows:

First—The member 9 is taken in the left hand of the operator, and the member 10 in the right and positioned so that their branches 1, 2, 3 and 4 point to the operator. As one operation, the branch 3 of the member 10 is extended downward through the loop of the member 9 and the branch 1 of the member 9 extended in an upward direction through the loop of the member 10, as shown in Fig. 1. Both members are then shoved toward each other as illustrated in Fig. 2 so that the convolute ends of the member 9 are relatively superimposed with the convolute ends of the member 10. The member 10 is then swung around the member 9 as shown in Fig. 3 so that the branch 4 of the member 10 underlies and intercepts the branch 2 of the member 9. Now, the members are manipulated to bring the branch 4 entirely from beneath the branch 2 as per Fig. 4, and the parts subsequently adjusted whereby the loop of one of said members is interthreaded with or hung from the loop of the other member, as shown in Fig. 4. This describes the successive steps of properly connecting the first two members with each other. At this time, it is said that ultimately three of the members forming the puzzle must be supported from a single member.

Second—The member 9 is taken in the left hand and the member 11 in the right hand and, as one operation, the branch 5 of the member 11 is passed in a downward direction through the loop of the member 9 and the branch 1 of the member 9 is passed in an upward direction through the loop of the member 11 as per Fig. 5. These members are then shoved toward each other as per Fig. 6 and the member 11 swung around the member 9, as illustrated in Fig. 7. The branch 6 of the member 11 is then extended in a downward direction through the loop of the member 10 as shown in Fig. 7, then around the branch 2 of the member 9 and back through the loop of the member 10.

Third—The member 10 is taken in the left hand and the member 11 in the right hand and the branch 6 of the member 11 extended down through the loop of the member 10 and at the same time the branch 4 of said member 10 is extended up through the loop of the member 11. The members 10 and 11 are then shoved together and the member 11 swung around the member 10 and the branch 5 of the member 11 extended around under the branch 3 of said member 10, as shown in Fig. 14.

Fourth—The member 9 is taken in the left hand and the member 12 in the right hand. The branch 7 of the member 12 is then extended down through the loop of the member 9 and at the same time, the branch 1 of said member 9 is extended up through the loop in the member 12. Both members are then shoved together and the member 12 swung around the loop of the member 9 and the branch 8 of the member 12 extended down through the loop in the members 10 and 11 and then around under the branch 2 of the member 9 and then back through the loop of the members 10 and 11.

Fifth—At this point in the operation of the puzzle, it is said that great care must be taken to insure that the branches 1 and 2 of the member 9 must be pointing up, and the branches 5 and 6 of the member 11 pointing down. The member 10 is then taken in the left hand and the member 12 in the right-hand and the branch 8 of the latter extended down through the loop in the members 10, and at the same time the branch 3 of the member 10 is extended up through the loop in the member 12. These members are then shoved together as in the previous step and the member 12 swung around the loop of the member 10 and the branch 8 extended down through the loop of said member 11 and then around under the branch 4 and back through the loop of said member 11.

Finally—The branch 4 of the member 10 is placed around over the branch 2 of the member 9. The member 9 is then swung around the member 10 and the latter and the former pulled apart by pulling the branch 1 up through the loop of the member 10 and at the same time, the branch 3 is extended down through the loop of said member 9. This completes the operation of assembling the four parts forming the puzzle and on reference to Fig. 25 it is seen that three of said parts are wholly supported from the loop of the remaining part.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as claimed.

Having thus described my invention, what I claim is:—

A puzzle comprising identical members, each member consisting of a single piece of wire bent to provide converging branches, said branches terminating in convoluted portions which merge into a loop disposed between said branches and having an inside diameter equal approximately to one-half of the distance between the free ends of the converging branches.

In testimony whereof I affix my signature in presence of two witnesses.

CLAUDIOUS BONNER WIXOM.

Witnesses:
L. W. GARNER,
T. O. MITCHMER.